United States Patent
Ciacci et al.

(10) Patent No.: US 8,781,051 B2
(45) Date of Patent: Jul. 15, 2014

(54) SYMBOL CLOCK RECOVERY CIRCUIT

(75) Inventors: Massimo Ciacci, 's-Hertogenbosch (NL); Remco Cornelis Herman van de Beek, Eindhoven (NL); Ghiath Al-kadi, Eindhoven (NL)

(73) Assignee: NXP, B.V., Eindhoven (NL)

( * ) Notice: Subject to any disclaimer, the term of this patent is extended or adjusted under 35 U.S.C. 154(b) by 88 days.

(21) Appl. No.: 13/417,486

(22) Filed: Mar. 12, 2012

(65) Prior Publication Data

US 2012/0269304 A1    Oct. 25, 2012

(30) Foreign Application Priority Data

Apr. 21, 2011  (EP) ................................... 11163565

(51) Int. Cl.
*H04L 7/00* (2006.01)

(52) U.S. Cl.
USPC ............ 375/360; 375/325; 375/355; 375/362

(58) Field of Classification Search
USPC ......... 375/316, 325–327, 340, 354, 355, 359, 375/360–362
See application file for complete search history.

(56) References Cited

U.S. PATENT DOCUMENTS

| | | | |
|---|---|---|---|
| 5,642,243 A | 6/1997 | Bliss | |
| 5,789,988 A | 8/1998 | Sasaki | |
| 5,999,355 A * | 12/1999 | Behrens et al. | 360/65 |
| 6,104,762 A * | 8/2000 | Fujimura | 375/324 |
| 6,127,897 A | 10/2000 | Sasaki | |
| 6,456,677 B1 * | 9/2002 | Hiramatsu et al. | 375/354 |
| 2007/0141983 A1 | 6/2007 | Shyu et al. | |

FOREIGN PATENT DOCUMENTS

| | | |
|---|---|---|
| EP | 0 732 829 A2 | 9/1996 |
| EP | 0 821 503 A2 | 1/1998 |
| GB | 2 165 110 A | 4/1986 |

OTHER PUBLICATIONS

Mueller, Kurt H., et al.; "Timing Recovery in Digital Synchronous Receivers"; IEEE Trans. on Commun., vol. 24, No. 5; pp. 516-531 (May 1976).

NASA Tech Brief; "Fast Synchronization with Burst-Mode Digital Signals"; NTIS Tech Notes; US Dept. of Commerce; Springfield, VA, US; p. 936 (Nov. 1, 1988).

Lee, Lin-Nan, eCOM-t al.; "Digital Signal Processor-Based Programmable BPSK/QPSK/OFFSET-QPSK Modems"; 8276 Comsat Technical Review 19(1989)Fall, No. 2, Clarksburg, MD, US; pp. 195-234 (Sep. 21, 1989).

Extended European Search Report for European patent appln. No. 11163565.2 (Sep. 7, 2011).

Communication from counterpart application EP11 163 565.2 (Nov. 27, 2013).

* cited by examiner

*Primary Examiner* — Dac Ha

(57) ABSTRACT

A symbol clock recovery circuit is provided for a data communication system using coherent demodulation. The symbol clock recovery circuit comprises an analog-to-digital converter comprising a first input for receiving a coherent-detected baseband analog signal derived from a carrier signal, a second input for receiving an adapted symbol clock signal, and an output for outputting a digital signal comprising a frame having a preamble with at least two symbols. The symbol clock recovery circuit comprises further a phase shifting unit comprising a first input for receiving a symbol clock signal derived from the carrier signal, and a timing detector, comprising a first input for receiving the digital signal from the analog-to-digital converter and an output for providing a signal comprising information about an optimum sample phase to the phase shifting unit.

14 Claims, 4 Drawing Sheets

SYMBOL CLOCK RECOVERY CIRCUIT

CROSS-REFERENCE TO RELATED APPLICATIONS

This application claims the priority under 35 U.S.C. §119 of European patent application no. 11163565.2, filed on Apr. 21, 2011, the contents of which are incorporated by reference herein.

FIELD OF THE INVENTION

The invention relates to a symbol clock recovery circuit.

Beyond this, the invention relates to a method of recovering a symbol clock.

Furthermore, the invention relates to a computer-readable medium.

Moreover, the invention relates to a program element.

BACKGROUND OF THE INVENTION

In the field of data communication systems, recovering of a transmitted signal is an important aspect. An information signal is transmitted by impressing modulation symbols onto a carrier, where the modulation scheme is chosen in such a way that the carrier is not suppressed at the receiving device. As a result, a carrier is available in the received signal for a carrier recovery circuit to lock on, and a coherent demodulation can take place.

The transmitted symbols are at a given phase and frequency relation with respect to the carrier. Normally the relation between symbol and carrier frequencies is known to the receiver. Therefore, based on the recovered carrier signal, the receiver can reconstruct a symbol clock, with the correct frequency but with an unknown phase with respect to the symbol transitions. Recovery of the correct symbol phase is a crucial function for reliable data detection.

U.S. Pat. No. 5,789,988 A discloses a clock recovery circuit in a demodulator of a multi-level quadrature amplitude modulation (QAM) system. An analog/digital (A/D) converter performs an A/D conversion upon a coherent-detected baseband analog signal in synchronization with a sampling clock signal having a time period half of a symbol time period. A phase detector receives successive first, second and third sampled data from the A/D converter, determines whether or not a signal transition formed by the first and second sampled data crosses a zero value within a predetermined time deviation, and compares a polarity of the second sampled data with a polarity of one of the first and second sampled data to generate a phase detection signal. Further, a loop filter is connected to an output of the phase detector, and a voltage controlled oscillator supplies the sampling clock signal to the A/D converter in accordance with an output signal of the loop filter.

U.S. Pat. No. 6,127,897 A discloses a clock recovery circuit in a demodulator of a multi-level quadrature amplitude modulation (QAM) system. An analog/digital (A/D) converter performs an A/D conversion upon an analog baseband signal in synchronization with a sampling clock signal having a time period that is a symbol time period. A phase detector receives successive first and third data sampled from the A/D converter, calculates second data by addition of the first and third data, determines whether or not a signal transition formed by the first and third data crosses a zero value within a predetermined deviation, and compares a polarity of the second data with a polarity of one of the first and third data, and generates a comparison result as a phase detection signal when the signal transition crosses the zero value. A loop filter passes a low-frequency component of the phase detection signal there through. A voltage controlled oscillator supplies the sampling clock signal to the A/D converter in accordance with an output signal of the loop filter.

U.S. Pat. No. 5,642,243 A discloses a timing recovery phase-locked loop (PLL) in a synchronous read channel for magnetic recording. The timing recovery phase-locked loop comprises a discrete time frequency error detector for locking the PLL to a sinusoidal reference signal. The sinusoidal reference signal is sampled, and a frequency error is computed using three sample values which span more than half a period of the reference signal.

OBJECT AND SUMMARY OF THE INVENTION

It is an object of the invention to provide a symbol clock recovery circuit, which may provide a fast and reliable recovery of the symbol clock.

In order to achieve the object defined above, a symbol clock recovery circuit, a method of adapting a symbol clock, a communication system, a computer-readable medium and a program element according to the independent claims are provided.

According to an exemplary embodiment of the invention, a symbol clock recovery circuit is provided, wherein the symbol clock recovery circuit comprises an analog-to-digital converter comprising a first input for receiving a coherent-detected baseband analog signal derived from a carrier signal, a second input for receiving an adapted symbol clock signal, and an output for outputting a digital signal comprising a frame having a preamble with at least two symbols, a phase shifting unit comprising a first input for receiving a symbol clock signal derived from the carrier signal, and a timing detector, comprising a first input for receiving the digital signal from the analog-to-digital converter and an output for providing a signal comprising information about an optimum sample phase to the phase shifting unit, wherein the timing detector is adapted for detecting at least one zero crossing occurring between the at least two symbols of the preamble of the frame of the digital signal, for determining a phase being associated with the zero crossing, and for calculating an optimum phase for sampling the coherent-detected baseband analog signal based on the calculated phase being associated with the zero crossing, wherein the phase shifting unit comprises a second input for receiving from the timing detector the optimum phase for sampling the coherent-detected baseband analog signal, and wherein the phase shifting unit is adapted for shifting the phase of the symbol clock signal according to the received optimum phase to generate an adapted symbol clock signal and for providing the adapted symbol clock signal to the analog-to-digital converter.

According to another exemplary embodiment of the invention, a method of adapting a symbol clock for a data communication system using coherent demodulation is provided. The method comprises by an analog-to-digital converter, receiving a coherent-detected baseband analog signal derived from a carrier signal, receiving an adapted symbol clock signal by the analog-to-digital converter, outputting a digital signal comprising a frame having a preamble with at least two symbols by the analog-to-digital converter, and receiving a symbol clock signal derived from the carrier signal by a phase shifting unit, by a timing detector, receiving the digital signal from the analog-to-digital converter and providing a signal comprising information about an optimum sample phase to the phase shifting unit, by the timing detector, detecting at least one zero crossing occurring between the at least two symbols of the preamble of the frame of the digital signal, determining a phase being associated with the zero crossing, and calculating an optimum phase for sampling the coherent-detected baseband analog signal based on the calculated phase being associated with the zero crossing, by the phase shifting unit, receiving from the timing detector the optimum phase for sampling the coherent-detected baseband analog signal, shifting the phase of the symbol clock signal according to the received optimum phase to generate an adapted symbol clock signal, and providing the adapted symbol clock signal to the analog-to-digital converter.

According to still another exemplary embodiment of the invention, a program element (for instance a software routine, in source code or in executable code) is provided, which, when being executed by a processor, is adapted to control or carry out a symbol clock adapting method having the above mentioned features.

According to yet another exemplary embodiment of the invention, a computer-readable medium (for instance a semiconductor memory, a CD, a DVD, a USB stick, a floppy disk or a harddisk) is provided, in which a computer program is stored which, when being executed by a processor, is adapted to control or carry out a symbol clock adapting method having the above mentioned features.

According to a further exemplary embodiment of the invention, a communication system for using coherent demodulation is provided. The communication system comprises a symbol clock recovery circuit having the above mentioned features.

Adapting a symbol clock, which may be performed according to embodiments of the invention, can be realized by a computer program that is by software, or by using one or more special electronic optimization circuits, that is in hardware, or in hybrid form, that is by means of software components and hardware components.

The symbol clock recovery circuit may also be called symbol clock adapting circuit as a sample frequency may be adapted in phase during the recovering process.

Exemplary embodiments of the invention may relate to a symbol clock recovery circuit for a data communication system using coherent demodulation. An information signal may be transmitted by impressing modulation symbols onto a carrier, where the modulation scheme may be chosen in such a way that the carrier is not suppressed at the receiving device. As a result, a carrier may be available in the received signal for a carrier recovery circuit to lock on, without the need of a crystal, and true coherent demodulation can take place.

The transmitted symbols are at a given phase and frequency relation with respect to the carrier. Normally the relation between symbol and carrier frequencies is known to the receiver. Therefore, based on the recovered carrier signal, the receiver can reconstruct a symbol clock, with the correct frequency but with an unknown phase with respect to the symbol transitions.

According to exemplary embodiments, a circuit or method is provided to reconstruct such a phase, for example by a digital baseband receiver, with only a few observations (in the order of the ratio between carrier freq. and symbol freq.), prior to any gain control or equalization, without prior knowledge of the channel, in a system where the demodulated signal watched through an oscilloscope manifests as a closed eye, and where baud rate sampling is employed.

Recovery of the correct symbol phase is a crucial function for reliable data detection. A transmitted symbol may be associated with a specific symbol response. More precisely, the channel has a certain symbol response, meaning that one symbol through the channel has a certain shape at the channel output. Such shape may be called the symbol response. The sampling should be done ideally on the point that maximizes the ratio between the energy of the present symbol to that of (interfering) previous and next symbols. For example, assuming a symbol duration equal to 8 carrier periods, the accuracy with which the sample time can be adjusted is assumed to be one carrier period; therefore there may be 8 possible sample phases per symbol. The problem of finding the correct symbol phase can then be redefined as the problem of selecting the best candidate over a finite set of sample phases.

For example, a slower clock derived from the carrier signal is used by the analog-to-digital converter (ADC) to sample the baseband signal. The phase shifter aligns this symbol clock to the optimum position according to a timing estimation provided by the timing detector. Proper choice of this timing is important, especially in a system that works at the baud rate, i.e. with only one sample per symbol. For instance, performance loss due to a wrong timing (of less than half a symbol time) may easily reach 3-4 dB.

In common systems, the symbol phase may be recovered by checking the zero crossings of the coherent baseband, which provides an early/late type of phase detector that is used to lock a PLL. Such a solution may provide several disadvantages. First, a solution in closed loop with a PLL may require many signal transitions (at least 40) before convergence is achieved, and the higher the Inter-Symbol Interference (ISI), the longer it will take for convergence. Slow convergence is then to be expected for a closed-eye system, dominated by ISI. Secondly, the estimated symbol timing, especially for multilevel modulation, might be sensitive to jitter and in general be less accurate than it can be achieved by exploiting knowledge of the symbol frequency. In fact, since the symbol frequency is known to the receiver, an extra PLL is altogether not required. Thirdly, such solutions might operate for instance at 2× the symbol rate, therefore requiring more power than a baud rate timing recovery as disclosed herein.

In a common baud rate timing recovery scheme, a timing misadjustment is obtained by correlating the received signal affected by a timing error, with a timing signature reference signal, reconstructed by assuming prior knowledge of the TX (transmitted) data. The output of such correlation is the value of a timing function, which should be zero in case the sample timing is correct. Fast estimation/compensation of the sample phase can then be constructed based on the output of this timing function, in either open loop or closed loop. However, in order for this to be possible, there are several requirements. First, the timing function should be zero when the sample timing is correct, and linear close to the zero crossing, which enforces the use of some sort of pulse shaping at the transmitter (when using NRZ pulses, an asymmetric symbol response would arise, which would generate a non linear timing function). Second the timing function can be measured only in specific systems, such as a PRML (Partial Response Maximum Likelihood) system where Inter-Symbol Interference (ISI) is conditioned by design. In other words, the timing misadjustment for a closed-eye system in this case can only be measured after some form of equalization has taken place, which has conditioned ISI to a prescribed level (Partial Response). This would make the overall loop delay longer and require therefore a longer timing acquisition.

Common systems based on locking a symbol PLL by observing the zero crossing of the coherent baseband are affected by slow convergence, especially for closed eye systems, and are sensitive to jitter in multi-level modulation. Common systems based on the above described common baud rate timing recovery scheme, are only possible if (1) the channel and its gain are known a priori, i.e. after PR equalization, and (2) the timing function is zero at the correct timing phase, and linear around it, i.e. pulse shaping at the transmitter is required.

In the following, embodiments of the invention will be described in further detail. Recovery of the correct symbol phase is a crucial function for reliable data detection. Even when a receiver contains an equalizer, incorrect sample timing can degrade receiver performance by 3-4 dB. The present symbol clock recovery circuit may provide a symbol phase recovery for a true-coherent demodulator receiver, where the transmitted carrier can be recovered at the receiving side.

In an exemplary embodiment, a simple digital implementation of a sample timing estimator may be used, coupled with a digitally controlled analog phase shifter, which does not require a PLL. This solution provides a fast locking onto the correct symbol phase within about $2*f_c/f_{Symb}$ symbol times, faster and more accurately than solutions based on PLL. For instance, for a symbol time of eight carrier periods, it might take merely 16 symbols to find the correct symbol phase.

The achieved timing accuracy might be largely insensitive to channel bandwidth variations, and does not require prior knowledge either of the channel or of the channel gain. Moreover this approach may work on open eye as well as on closed eye systems, even without pulse shaping at the transmitter.

Furthermore, since the proposed sample phase recovery loop does not include the equalizer, there is no risk of interaction between the timing estimator—phase shifter loop and the equalizer. In the case that an equalizer output would be used by a timing estimator, it may occur that the equalizer can adaptively shift the timing observed by the estimator in one direction and this in turn control the phase shifter in the opposite direction.

The symbol clock recovery may be carried out on symbols of a preamble of a frame. The preamble may comprise at least two symbols and a zero crossing may be detected between these two symbols. For instance in an exemplary embodiment, the symbols in the preamble may be in an amount of at least 2*Nc symbols. In this case, Nc defines how accurate the timing detection will be with respect to the carrier time.

In the present symbol clock recovery circuit, a timing estimator is used for recovering the symbol phase. The symbol frequency is in a known relation to the carrier frequency, and since this can be recovered, only the symbol phase is unknown. In the present circuit, a simple, fast, low-power digital implementation of a sample timing estimator may be used, coupled with a digitally controlled analog phase shifter, which does not require a PLL. This solution may provide a faster locking onto the correct symbol phase within just $2*f_c/f_{Symb}$ symbol times, as described above, faster and more accurately than solutions based on PLL.

Observing the zero crossings of a low frequency tone may be more robust to unknown bandwidth limitation than observing the peak of a narrow pulse. Such a low frequency tone can be realized by a periodic preamble, for example by a 4T periodic preamble (1,1,−1,−1). Symbol phase recovery may be based on observing the zero crossings of a periodic preamble, while changing the sample phase, and calculating the ideal sample time in relation to these. The periodic preamble is meant to provide low-jitter zero crossings, also in the presence of severe bandwidth limitations, and a predictable large amount of signal transitions.

Such a periodic preamble is often used in PRML systems, where conditioning the Inter-Symbol-Interference ISI is a pre-requisite for timing recovery, together with pulse shaping at the transmitter. In the present embodiment, no a-priori knowledge of the channel and its gain is needed. Timing recovery is performed at the very beginning of the digital receiver, before any filtering takes place. This further reduces the time needed to acquire the correct timing.

For sake of simplicity, the output of the analog-to-digital receiver may be considered as a one dimensional ADC output, namely the phase of the baseband IQ signal, a non-suppressed carrier PSK modulation, without pulse shaping at the transmitter (NRZ pulses). In the case of a different non-suppressed carrier modulation, both IQ components would be needed. The structure of the symbol clock recovery circuit might be the same, replicated on two branches, except the timing detector block, which could be implemented on only one branch.

When a frame begins, the timing detector may, in one embodiment, sweep a finite number of sample phases τ (Tau), and select an optimum sample phase based on the ADC output observations. The fact that the decision may be based directly on the ADC output values minimizes the time it will take to find the optimum timing. Once the selection is done the sample timing might not be changed until the next frame.

The Timing Detector may base its decision on the observation of the ADC samples, by changing the sample phase. In the general case of a closed eye system, i.e. a system where ISI may be dominating, making the symbol transitions difficult to detect, timing detection might be performed not on a random symbol sequence as preamble, but rather on a periodic preamble pattern, for example a 4T preamble (1,1,−1,−1).

In the following, further exemplary embodiments of the symbol clock recovery circuit will be explained. However, these embodiments also apply to the method, to the communication system, to the program element and to the computer-readable medium.

The symbol clock recovery circuit may further comprise an activity detector, wherein the activity detector comprises an input for receiving the digital signal from the analog-to-digital converter and an output for providing a trigger signal to a second input of the timing detector, wherein the activity detector is adapted for monitoring the digital signal, for detecting a first symbol of a frame within the digital signal and for providing the trigger signal in response to the detection of the first symbol, wherein the timing detector is adapted for starting its operation based on the trigger signal.

The samples (in this example PSK symbol phases) from the ADC may be monitored by the activity detector, in order to detect when the first symbol of a frame is received. If the transmission is preceded by silence, the activity detector can be as simple as a differentiator followed by a threshold detector, which will detect any non-DC signal. When a frame begins, the activity detector may send a trigger to the timing detector which begins its operation, by sweeping a finite number of sample phases τ, and selecting an optimum sample phase based on the ADC output observations.

The symbol clock recovery circuit may further comprise a mean value estimator, wherein the mean value estimator comprises an input for receiving the digital signal from the analog-to-digital converter and an output for providing a reference zero level to a third input of the timing detector, wherein the mean value estimator is adapted for estimating the reference zero level based on the digital signal. Such a mean value estimator can conveniently be running already before the beginning of the frame, i.e. before the preamble, during transmission of an un-modulated carrier.

The timing detector may thus receive a reference zero level, namely the DC (direct current) offset, which can arise for example from analog imperfections in the ADC block, and which is estimated by the mean value (DC) estimator.

The symbol clock recovery circuit may further comprise an equalizer for removing interferences from the digital signal, wherein the equalizer comprises an input for receiving the digital signal and an output for outputting an equalized signal.

An (adaptive) equalizer, also at the symbol rate, having a fixed group delay which is known to the timing detector, may remove interference from the ADC samples. If a non integer group delay equalizer is used, this delay might be subtracted from the final sample phase chosen by the timing detector.

The symbol clock recovery circuit may further comprise a slicer for generating binary symbols, wherein the slicer comprises an input for receiving the equalized signal and an output for outputting the generated binary symbols. The equalizer may deliver the equalized signal to the slicer to generate the detected binary symbols.

The timing detector may comprise a minimum detection unit for detecting a minimum of an absolute value of the at least two (sampled) symbols for detecting at least one zero crossing between the at least two symbols.

In one simple embodiment of the symbol clock recovery circuit, the sample phase $\tau_{zc}$ of a zero crossing may be found by sweeping over a number of sample phases, and finding the minimum of an absolute value, as explained hereafter. Assume a symbol time is subdivided into $N_t$ possible sample phases, known to the phase shifter. One simple choice might be to have one sample instant per carrier period, which makes $N_t=N_c=f_c/f_{Symb}=8$. On a trigger signal a control block will enable a CMD counter which generates a command sequence [0 . . . $N_t$−1], where each value is repeated twice so as to generate a given sample phase both for the odd and even samples of the 4T pattern. The command sequence may be sent to the phase shifter, which will respond with a latency L, meaning that it will produce a new ADC output sample phase within L symbols. The ADC samples are corrected for DC, i.e. by subtracting their mean value, and the absolute value is calculated. The zero crossing time is found by seeking the minimum of this absolute value over the $N_t$ observations, and the sample phase $\tau_{zc}$ at which this minimum occurs. To this aim, the sample phase commands $\tau_{Tx}$ sent to the phase shifter may be realigned by a shift register having length L. After these observations, based on $\tau_{zc}$, the optimum sample phase $\tau_0$ is calculated by a "Calculate Sample Phase" unit as $\tau_0=\tau_{zc}+6$ or $\tau_0=\tau_{zc}-2$ depending if the zero crossing happened on an odd/even symbol of the 4T pattern. The last sample phase command may be sent to the phase shifter, and within L symbols the ADC output will show the correct symbol timing. Distinguishing the odd/even symbols in calculating $\tau_0$ may be useful to keep track of which symbol is being received when a zero crossing is found.

The timing detector may be adapted for calculating the optimum phase based on a predetermined delay, which depends on the channel bandwidth.

The instants when the zero crossings occur are typically in delay with respect to the symbol transition (considering NRZ pulses), by an amount that depends on the channel bandwidth. In general, lower bandwidth channels will cause larger delays. This is in agreement with the fact that the optimum sample time, should also be delayed for lower bandwidth channels.

The timing detector may be part of a digital receiver.

In the following, further exemplary embodiments of communication system will be explained. However, these embodiments also apply to the symbol clock recovery circuit, the method, to the program element and to the computer-readable medium.

The communication system may further comprise a phase-locked loop for receiving a carrier signal, and a mixer, wherein the phase-locked loop is adapted for performing carrier recovery on the received carrier signal, and wherein the mixer is adapted for generating the coherent-detected baseband analog signal by mixing the carrier signal and an output signal of the phase-locked loop. A carrier HF signal may be coherently demodulated by carrier recovery by means of a phase-locked loop (PLL) and mixing.

The communication system may further comprise a frequency divider for deriving a symbol clock from the carrier signal and for providing the symbol clock to the phase shifter of the symbol recovery circuit.

A slower symbol clock may be derived from the carrier signal by the frequency divider ($Nc=f_c/f_{Symb}$=number of carrier periods per symbol). This slower clock may then be used by the ADC to sample the baseband signal. The phase shifter may align this symbol clock to the optimum position according to the timing estimation provided by the timing detector. Proper choice of this timing is crucial, especially in a system that works at the baud rate, i.e. with only one sample per symbol. The frequency divider and the phase shifter may be combined by using a programmable counter-based frequency divider The aspects defined above and further aspects of the invention are apparent from the examples of embodiment to be described hereinafter and are explained with reference to these examples of embodiment.

BRIEF DESCRIPTION OF THE DRAWINGS

The invention will be described in more detail hereinafter with reference to examples of embodiment but to which the invention is not limited.

DESCRIPTION OF EMBODIMENTS

Figure 1:
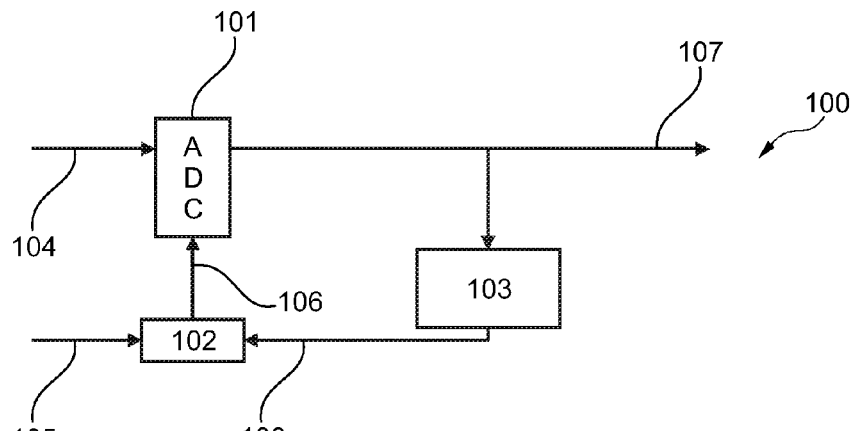
FIG. 1 illustrates a symbol clock recovery circuit according to an exemplary embodiment of the invention.

The illustration in the drawing is done schematically. In different drawings, similar or identical elements are provided with the same reference signs.

FIG. 1 illustrates a symbol clock recovery circuit 100 according to an exemplary embodiment of the invention. The symbol clock recovery circuit 100 may be used in a data communication system using coherent demodulation. The symbol clock recovery circuit comprises an analog-to-digital converter 101. The analog-to-digital converter (ADC) comprises a first input for receiving a coherent-detected baseband analog signal 104 derived from a carrier signal, a second input for receiving an adapted symbol clock signal 106, and an output for outputting a digital signal 107 comprising a frame having a preamble with at least one symbol. The symbol clock recovery circuit comprises further a phase shifting unit 102 comprising a first input for receiving a symbol clock signal 105 derived from the carrier signal. Furthermore, the symbol clock recovery circuit comprises a timing detector 103, comprising a first input for receiving the digital signal from the analog-to-digital converter and an output for providing a signal 108 comprising information about an optimum sample phase to the phase shifting unit.

The timing detector 103 is adapted for detecting at least one zero crossing between two symbols of the preamble of the frame of the digital signal, and for determining a phase being associated with the zero crossing. Based on the calculated phase being associated with the zero crossing, the timing detector calculates an optimum phase for sampling the coherent-detected baseband analog signal.

The phase shifting unit 102 comprises a second input for receiving from the timing detector the optimum phase for sampling the coherent-detected baseband analog signal. The phase shifting unit shifts the phase of the symbol clock signal according to the received optimum phase to generate an adapted symbol clock signal. The adapted symbol clock signal is then provided to the analog-to-digital converter.

In such a data communication system using coherent demodulation, an information signal is transmitted by impressing modulation symbols onto a carrier, where the modulation scheme is chosen in such a way that the carrier is not suppressed at the receiving device. As a result, a carrier is available in the received signal for a carrier recovery circuit to lock on, without the need of a crystal, and true coherent demodulation can take place.

The transmitted symbols are at a given phase and frequency relation with respect to the carrier. Normally the relation between symbol and carrier frequencies is known to the receiver. Therefore, based on the recovered carrier signal, the receiver can reconstruct a symbol clock, with the correct frequency but with an unknown phase with respect to the symbol transitions. The phase may be reconstructed with a symbol clock recovery circuit as described in FIG. 1.

Figure 2:
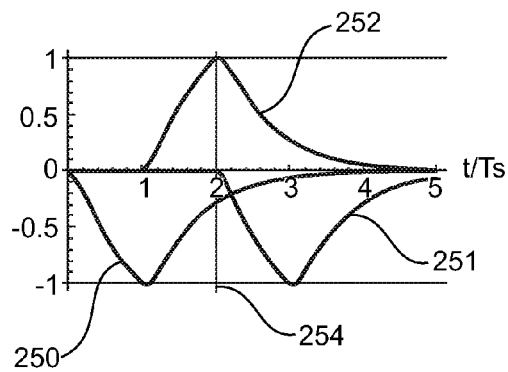
FIGS. 2 and 3 illustrate possible sample times for a symbol.
Figure 3:
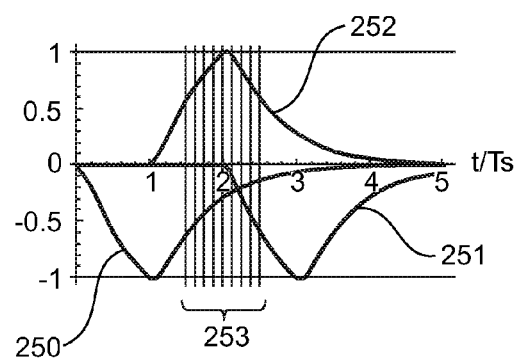

Recovery of the correct symbol phase is a crucial function for reliable data detection. An example of this problem is given in FIGS. 2 and 3. The curve 252 is the symbol response to the present received symbol; the curves 250 and 251 are the symbol responses to the previous and next received symbols. The sampling should be done ideally on the point 254 that maximizes the ratio between the energy of the present symbol to that of the (interfering) previous and next symbols. In this example, the symbol duration is considered equal to 8 carrier periods. The accuracy with which the sample time can be adjusted is assumed to be one carrier period therefore there are 8 possible sample phases 253 per symbol (FIG. 3). The problem of finding the correct symbol phase can then be redefined as the problem of selecting the best candidate over a finite set of sample phases.

Figure 4:
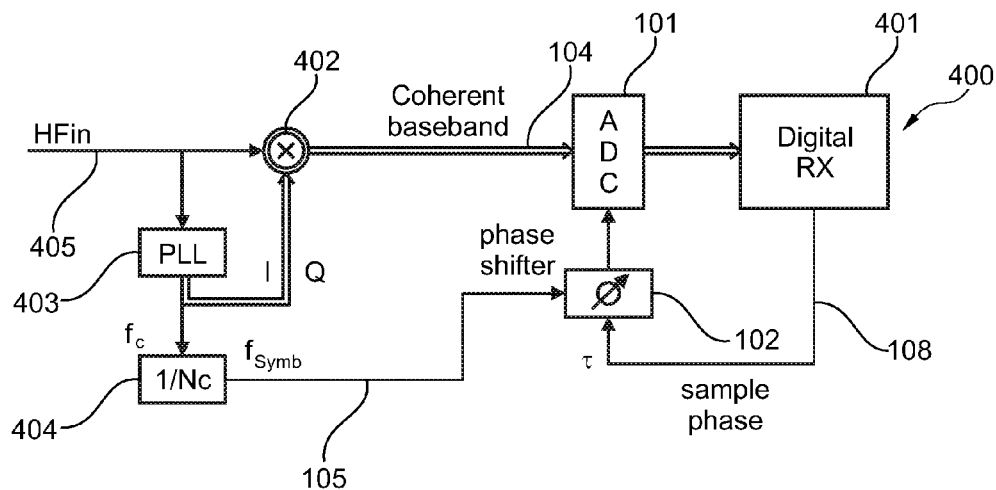
FIG. 4 illustrates a communication system according to an exemplary embodiment of the invention.

One example of a communication system 400 comprising a symbol clock recovery unit as described with FIG. 1 is shown in FIG. 4. This communication system is more a conceptual situation, where a non suppressed carrier HF signal 405 is coherently demodulated by carrier recovery 403 (PLL) and mixing 402 and where a slower symbol clock is derived from the carrier signal by a frequency divider 404 ($Nc=f_c/f_{Symb}$=number of carrier periods per symbol). This slower clock is then used by an ADC 101 to sample the baseband signal 104. A phase shifter 102 aligns this symbol clock to the optimum position according to a timing estimation provided by a symbol clock recovery circuit, which may be part of the digital receiver 401. Proper choice of this timing is crucial, especially in a system that works at the baud rate, i.e. with only one sample per symbol. In fact, although the Digital RX may include an equalizer, the performance loss due to a wrong timing (of less than half a symbol time) easily reaches 3-4 dB.

Figure 5:
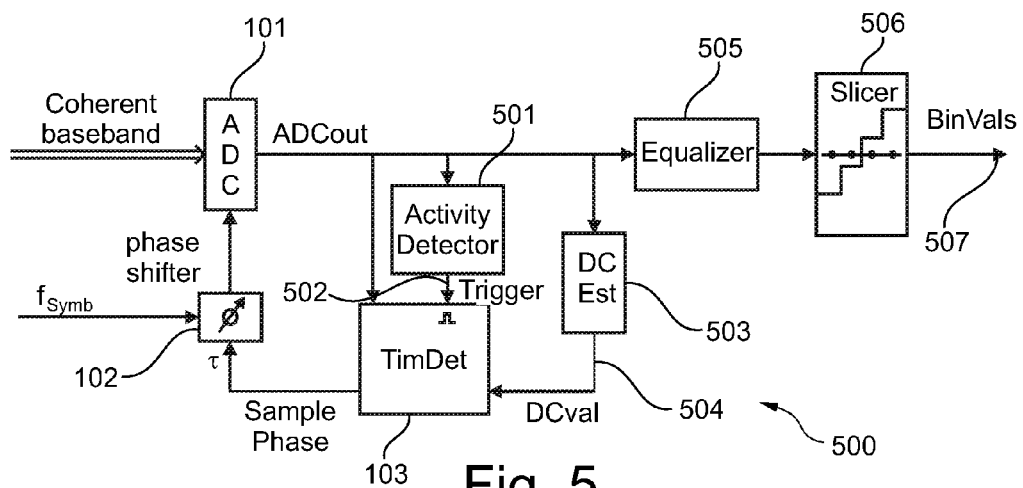
FIG. 5 illustrates a symbol clock recovery circuit according to a further embodiment of the invention.

FIG. 5 illustrates a further exemplary embodiment of a symbol clock recovery circuit 500, which may be part of a digital receiver. For the sake of simplicity, a one dimensional ADC output, namely the phase of the baseband IQ signal, and a non-suppressed carrier PSK modulation is considered, without pulse shaping at the transmitter (NRZ pulses). In the case of a different non-suppressed carrier modulation, both IQ components would be needed. Nevertheless the structure of this receiver would be the same, replicated on two branches, except the timing detector, which could be implemented on only one branch.

The samples (symbol phases) from the ADC 101 are monitored by an activity detector 501. Its task is to detect when the first symbol of a frame is received. If the transmission is preceded by silence, the activity detector can be as simple as a differentiator followed by a threshold detector, which will detect any non-DC signal. When a frame begins, this block gives a trigger 502 to the timing detector which begins its operation, by sweeping a finite number of sample phases τ, and selecting an optimum sample phase based on the ADC output observations. The fact that the decision is based directly on the ADC output values minimizes the time it will take to find the optimum timing. Once the selection is done the sample timing is not changed until the next frame. The timing detector also receives a reference zero level 504, namely the DC offset, which can arise for example from analog imperfections in the ADC block, and which is estimated by a dedicated DC estimator 503. An (adaptive) equalizer 505, also at the symbol rate, having a fixed group delay which is known to the timing detector, removes interference from the ADC samples and delivers them to a slicer 506 to generate the detected binary symbols 507.

Figure 6:
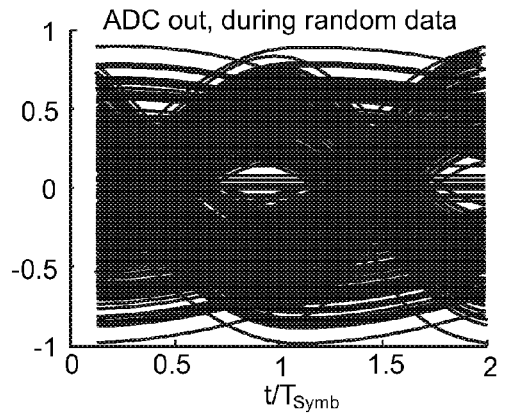
FIGS. 6 and 7 illustrate possible eye diagrams of an ADC output.
Figure 7:
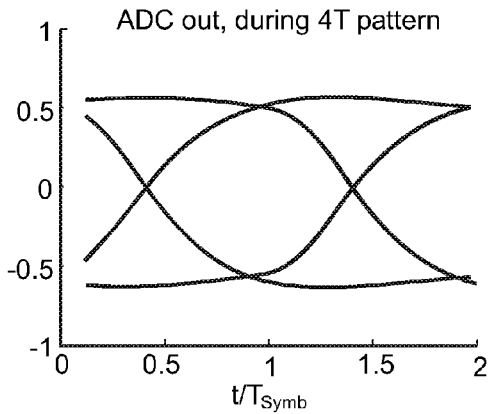

The timing detector bases its decision on the observation of the ADC samples, by changing the sample phase. Considering the general case of a closed eye system, timing detection is not performed on a random symbol sequence, but rather on a periodic preamble pattern, for example a 4T preamble (1,1,−1,−1). Such a pattern has the ability to open the signal eye as shown in FIGS. 6 and 7. In FIG. 6, a random symbol sequence is considered. Due to interference, the zero crossings (when a symbol transition does occur) are spread over half of a symbol time. In FIG. 7, instead, a periodic preamble pattern is considered. Here it may be easy seen that the signal crosses the zero level at precise times (i.e. without spread), somewhere in between the symbol transition times, which are aligned with the integer values on the x axis.

The instants when the zero crossings occur (see FIG. 7) are in delay with respect to the symbol transition (considering NRZ pulses), by an amount that depends on the channel bandwidth. In general, lower bandwidth channels will cause larger delays. This is in agreement with the fact that the optimum sample time, as shown in FIG. 2, should also be delayed for lower bandwidth channels.

Figure 8:
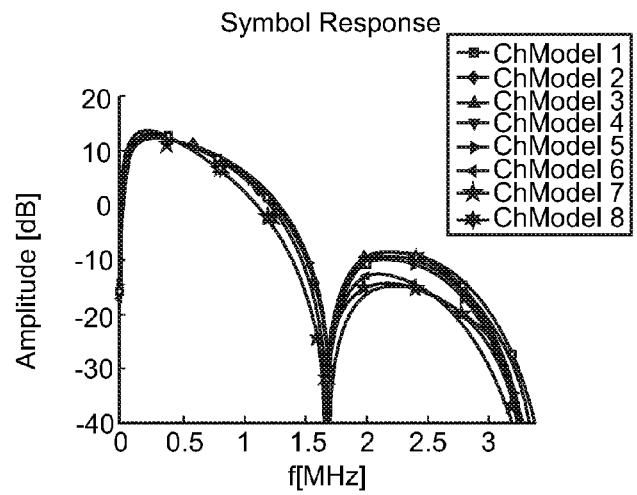
FIG. 8 illustrates NRZ symbol responses of different exemplary channel models.

In the following, a specific application, namely RFID, is considered and therefore a specific channel model; this however does not limit the validity of the described embodiments for other applications. A closed-eye channel model given by the following components will be considered: two magnetic coupled antennas centered at the RFID frequency $f_c$=13.56 MHz, NRZ pulses at the Symbol frequency $f_{Symb}=f_c/8$, a high-pass filter caused by the coherent demodulation of FIG. 4, where the PLL bandwidth has been chosen equal to 100 kHz. Such channel model is described by the symbol response reported in FIG. 8. Here, 8 different configurations are considered for the antennas coupling, quality factor (ranging from 4 to 14), and frequency tuning error (ranging from −100 kHz to 100 kHz). The ideal sample times for these 8 configurations differ from each other at most ~0.42 Tc, and are always close to an NRZ pulse transition.

Figure 9:
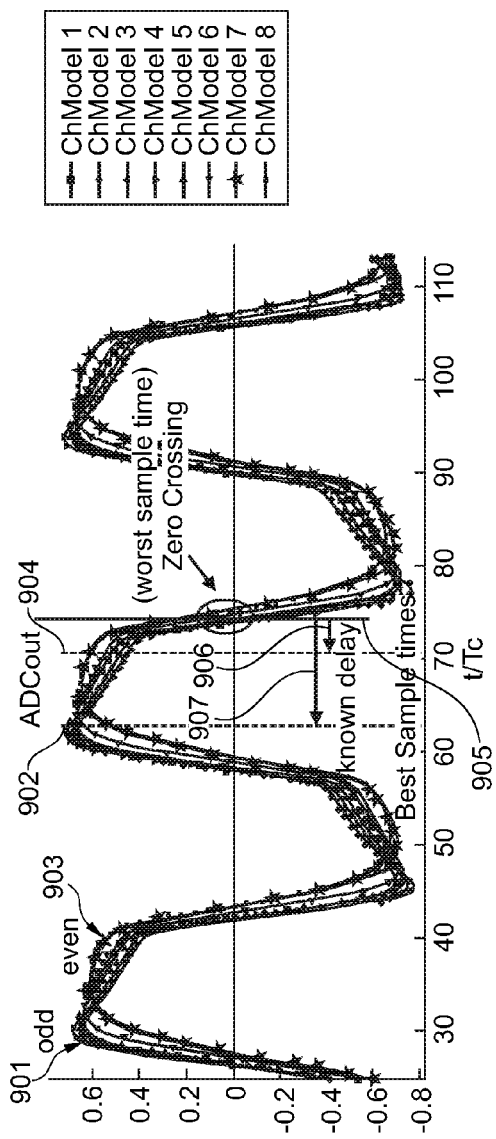
FIG. 9 illustrates a signal at the ADC input for exemplary channels during the preamble.

The signal at the ADC input for the mentioned 8 channels during the 4T preamble is shown in FIG. 9. The 4T pattern consists of (1,1,−1,−1). The first 1 and first −1 are denoted as odd symbols 901, and the second ones as even symbols 903. The ideal sample times, having a certain sample phase $\tau_0$, are indicated in FIG. 9 by the dashed vertical lines 902, 904 and coincide with the NRZ pulses transitions. At these instants the signal varies significantly over the different channels. The zero crossing times, occurring every 2 symbols, at a given sample phase $\tau_{zc}$, are all close together, approximately 2 carrier times in delay from an even symbol (906) or 6 carrier times in anticipation of an odd symbol (907).

The task of the timing detector is then to find the sample phase $\tau_{zc}$ of at least one of such zero crossings 905, keep track if it is observing an odd/even symbol, and calculate the ideal sample phase $\tau_0$ accordingly. If the signal is affected by DC, which is available to the timing detector by the DC estimator providing a zero reference level, the 0 level might need to be changed accordingly.

Figure 10:
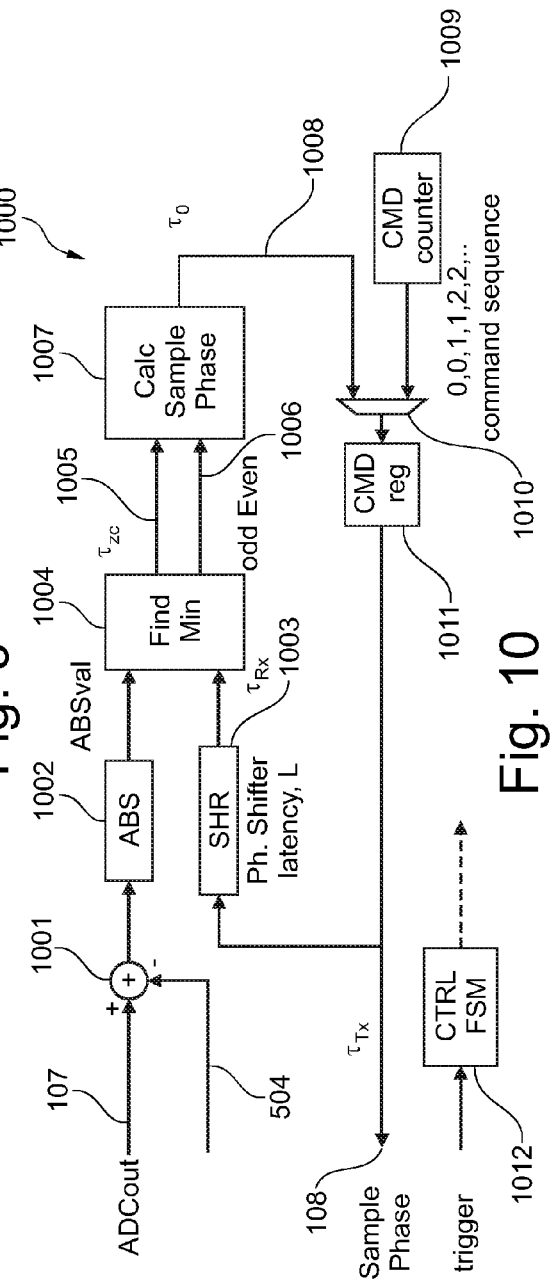
FIG. 10 illustrates a timing detector according to an exemplary embodiment of the invention.

One simple embodiment of the timing detector 1000 is illustrated by FIG. 10. The sample phase $\tau_{zc}$ of a zero crossing is found by sweeping over a number of sample phases, and finding the minimum of abs(ADCout−DCval), as explained hereafter. Assume a symbol time is subdivided into $N_t$ possible sample phases, known to the phase shifter of FIG. 1 or 5. One simple choice is to have one sample instant per carrier period, which makes $N_t=N_c=f_c/f_{Symb}=8$. On a trigger signal a control block 1012 will enable a CMD counter 1009, which generates a command sequence [0 . . . $N_t$−1], where each value is repeated twice so as to generate a given sample phase both for the odd and even samples of the 4T pattern (see FIG. 9). Notice that one can delay, for example within a command register 1011, this sequence so as to avoid possible transients at the beginning of the preamble. The command sequence is sent to the phase shifter of FIG. 1 or 5, which will respond with a latency L, meaning that it will produce a new ADC output sample phase within L symbols. The ADC samples are corrected for DC by mixing 1001 them with the zero reference level, and the absolute value is calculated 1002. The zero crossing time is found by seeking the minimum 1004 of this absolute value over the $N_t$ observations, and the sample phase $\tau_{zc}$ 1005, at which this minimum occurs. To this aim, the sample phase commands $\tau_{Tx}$ sent to the phase shifter are realigned by a shift register 1003 having length L. After these observations, based on $\tau_{zc}$, the optimum sample phase $\tau_0$ 1008 is calculated by the "Calc Sample Phase" block 1007 as $\tau_0=\tau_{zc}+6$ or $\tau_0=\tau_{zc}−2$ depending if the zero crossing happened on an odd/even symbol 1006 of the 4T pattern. The last sample phase command is sent to the phase shifter, and within L symbols the ADC output will show the correct symbol timing. A timingDone flag might be sent from the CTRL FSM 1012 to the rest of the receiver. Distinguishing the odd/even symbols in calculating $\tau_0$ is useful to keep track of which symbol is being received when a zero crossing is found.

Figure 11:
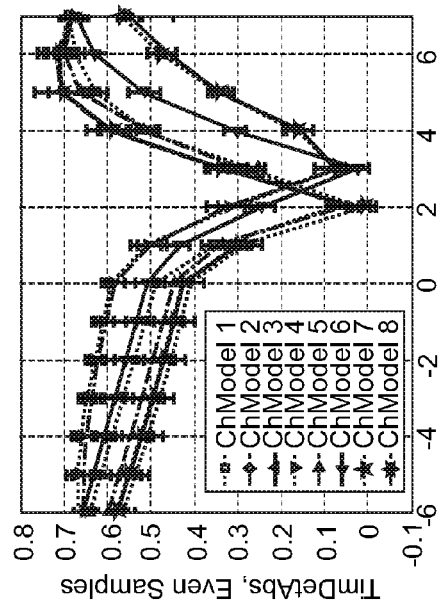
FIGS. 11 and 12 illustrate performance of the decisions made in the detector of FIG. 10.
Figure 12:
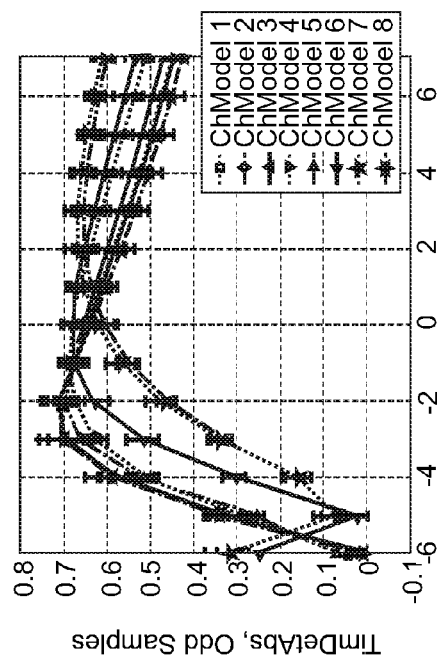
Figure 13:
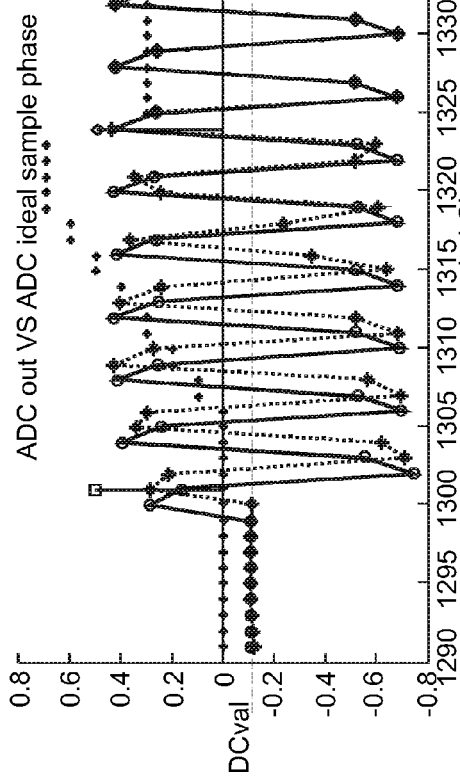
FIG. 13 illustrates simulation results of the exemplary embodiment of FIG. 10.

The performance of the decisions of this embodiment is shown in FIGS. 11 and 12, where the absolute value for the 8 different channel models shows a clear minimum at either 6 carrier times in anticipation or 2 carrier times in delay of symbol transition, depending if we observe an odd or even 4T symbol. FIG. 11 illustrates an absolute value of the 4T preamble, over 8 different channel models, as a function of the sample phase offset with respect to the symbol transitions, showing the minimum search for the odd 4T symbols, wherein FIG. 12 illustrates the minimum search for the even 4T symbols. This embodiment has been simulated in closed loop with the Analog Front End (phase shifter+ADC), and tested also in real hardware. The simulation results are given in FIG. 13, where the true ADC samples are shown to lock onto the ideal phase ADC samples, after 2*Nc+L=20 symbols.

The discussed embodiment can be generalized to another type of zero crossing detection, which may also include interpolation of samples before and after the zero crossing. Moreover a slower pattern than the 4T (e.g. an 8T) might be considered for a system with a signal eye that is even more closed. However this would come at a cost of a longer locking time, due to less frequent symbol transitions.

It should be noted that the term "comprising" does not exclude other elements or features and the "a" or "an" does not exclude a plurality. Also elements described in association with different embodiments may be combined.

It should also be noted that reference signs in the claims shall not be construed as limiting the scope of the claims.

The invention claimed is:

1. A symbol clock recovery circuit for a data communication system using coherent demodulation, the symbol clock recovery circuit comprising
    an analog-to-digital converter comprising a first input for receiving a coherent-detected baseband analog signal derived from a carrier signal, a second input for receiving an adapted symbol clock signal, and an output for outputting a digital signal comprising a frame having a preamble with at least two symbols,
    a phase shifting unit comprising a first input for receiving a symbol clock signal derived from the carrier signal, and
    a timing detector, comprising a first input for receiving the digital signal from the analog-to-digital converter and an output for providing a signal comprising information about an optimum sample phase to the phase shifting unit,
    wherein the timing detector is adapted for detecting at least one zero crossing between the at least two symbols of the preamble of the frame of the digital signal, for determining a phase being associated with the at least one zero crossing, and for calculating an optimum phase for sampling the coherent-detected baseband analog signal based on the calculated phase being associated with the at least one zero crossing,
    wherein the phase shifting unit comprises a second input for receiving from the timing detector the optimum phase for sampling the coherent-detected baseband analog signal, and
    wherein the phase shifting unit is adapted for shifting the phase of the symbol clock signal according to the received optimum phase to generate an adapted symbol clock signal and for providing the adapted symbol clock signal to the analog-to-digital converter.

2. The symbol clock recovery circuit according to claim 1, further comprising
    an activity detector,
    wherein the activity detector comprises an input for receiving the digital signal from the analog-to-digital converter and an output for providing a trigger signal to a second input of the timing detector,
    wherein the activity detector is adapted for monitoring the digital signal, for detecting a first symbol of a frame within the digital signal and for providing the trigger signal in response to the detection of the first symbol,
wherein the timing detector is adapted for starting its operation based on the trigger signal.

3. The symbol clock recovery circuit according to claim 1, further comprising
a mean value estimator,
wherein the mean value estimator comprises an input for receiving the digital signal from the analog-to-digital converter and an output for providing a reference zero level to a third input of the timing detector,
wherein the mean value estimator is adapted for estimating the reference zero level based on the digital signal.

4. The symbol clock recovery circuit according to claim 1, further comprising
an equalizer for removing interferences from the digital signal, wherein the equalizer comprises an input for receiving the digital signal and an output for outputting an equalized signal.

5. The symbol clock recovery circuit according to claim 4, further comprising
a slicer for generating binary symbols, wherein the slicer comprises an input for receiving the equalized signal and an output for outputting the generated binary symbols.

6. The symbol clock recovery circuit according to claim 1, wherein the timing detector comprises
a minimum detection unit for detecting a minimum of an absolute value of the at least two symbols for detecting a zero crossing between the at least two symbols.

7. The symbol clock recovery circuit according to claim 1, wherein the timing detector is adapted for calculating the optimum phase based on a predetermined delay, which depends on the channel bandwidth.

8. The symbol clock recovery circuit according to claim 1, wherein the timing detector is part of a digital receiver.

9. A communication system for using coherent demodulation, the communication system comprising a symbol clock recovery circuit according to claim 1.

10. The communication system according to claim 9, further comprising
a phase-locked loop for receiving a carrier signal, and
a mixer,
wherein the phase-locked loop is adapted for performing carrier recovery on the received carrier signal, and
wherein the mixer is adapted for generating the coherent-detected baseband analog signal by mixing the carrier signal and an output signal of the phase-locked loop.

11. The communication system according to claim 9, further comprising
a frequency divider for deriving a symbol clock from the carrier signal and for providing the symbol clock to the phase shifting unit of the symbol recovery circuit.

12. Method of adapting a symbol clock for a data communication system using coherent demodulation, the method comprising
by an analog-to-digital converter, receiving a coherent-detected baseband analog signal derived from a carrier signal, receiving an adapted symbol clock signal by the analog-to-digital converter, outputting a digital signal comprising a frame having a preamble with at least two symbols by the analog-to-digital converter, and receiving a symbol clock signal derived from the carrier signal by a phase shifting unit,
by a timing detector, receiving the digital signal from the analog-to-digital converter and providing a signal comprising information about an optimum sample phase to the phase shifting unit,
by the timing detector, detecting at least one zero crossing between the at least two symbols of the preamble of the frame of the digital signal, determining a phase being associated with the zero crossing, and calculating an optimum phase for sampling the coherent-detected baseband analog signal based on the calculated phase being associated with the zero crossing,
by the phase shifting unit, receiving from the timing detector the optimum phase for sampling the coherent-detected baseband analog signal, shifting the phase of the symbol clock signal according to the received optimum phase to generate an adapted symbol clock signal, and providing the adapted symbol clock signal to the analog-to-digital converter.

13. A non-transitory, tangible computer-readable medium, in which a computer program of adapting a symbol clock is stored, which computer program, when being executed by a processor, is adapted to carry out or control a method according to claim 12.

14. A non-transitory, tangible computer-readable medium containing a program element which adapts a symbol clock, which program element, when being executed by a processor, is adapted to carry out or control a method according to claim 12.

* * * * *